United States Patent [19]
Houlihan et al.

[11] B 3,925,476

[45] Dec. 9, 1975

[54] 10-(2-DIALKYLAMINOETHYL)-10,11-DIHYDRO, OR 10-(2-DIALKYLAMINOETHYL)-5-METHYLENE-2,7-SUBSTITUTED OR UNSUBSTITUTED-5H-DIBENZO[A,D]CYCLOHEPTENES

[75] Inventors: William J. Houlihan, Mountain Lakes, N.J.; Jeffrey Nadelson, Lake Parsippany, N.J.

[73] Assignee: Sandoz, Inc., E. Hanover, N.J.

[22] Filed: Feb. 7, 1972

[21] Appl. No.: 224,323

[44] Published under the Trial Voluntary Protest Program on January 28, 1975 as document no. B 224,323.

[52] U.S. Cl. .............260/570.8 TC; 260/343.2 R; 260/501.1; 260/501.21; 260/518 R; 260/518 A; 260/519; 260/558 A; 260/558 D; 260/570.5 C; 424/316; 424/330

[51] Int. Cl.² .......................................... C07C 87/29

[58] Field of Search ..... 260/501.1, 501.2, 570.8 TC

[56] References Cited
UNITED STATES PATENTS 3,409,640   11/1968   Villani ............................ 260/570.8

3,649,692   3/1972   Humber ........................... 260/570.9

OTHER PUBLICATIONS

Russel, "Chemical Abstracts," Vol. 71, p. 323, No. 101611w (1969).

"Chemical Reviews," Vol. 64, No. 3, pp. 243–244 and 246–247 (1964).

Cope et al., "Journal American Chemical Society," Vol. 73, pp. 1674–1675 and 1677 (1951).

Primary Examiner—Robert V. Hines
Attorney, Agent, or Firm—Gerald D. Sharkin; Robert S. Honar

[57] ABSTRACT

10-(2-dialkylaminoethyl)-10,11-dihydro, or 10-(2-dialkylaminoethyl)-5-methylene-2,7-substituted or unsubstituted-5H-dibenzo[a,d]cyclo-heptenes e.g. 10-(2-dimethylaminoethyl)-10,11-dihydro-5-methylene-5H-dibenzo[a,d]cycloheptene, prepared by acid dehydration the corresponding dibenzo[a,d]cycloheptene-5-ols. The compounds are useful as anti-depressants.

3 Claims, No Drawings

10-(2-DIALKYLAMINOETHYL)-10,11-DIHYDRO, OR 10-(2-DIALKYLAMINOETHYL)-5-METHYLENE-2,7-SUBSTITUTED OR UNSUBSTITUTED-5H-DIBENZO[A,D]CYCLOHEPTENES

This invention relates to 5-methylene-5H-dibenzo[a,d]cycloheptenes. More particularly, it relates to 10-(2-dialkylaminoethyl)-10, 11-dihydro, or 10-(2-dialkylaminoethyl)-5-methylene-2,7-substituted or un-substituted-5H-dibenzo[a,d]cycloheptenes, acid addition salts thereof, intermediates thereof, and processes for their preparation.

The compounds of this invention may be represented by the following structural formula:

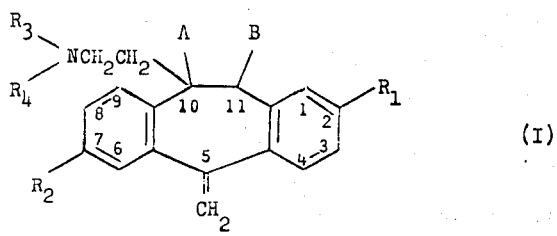

(I)

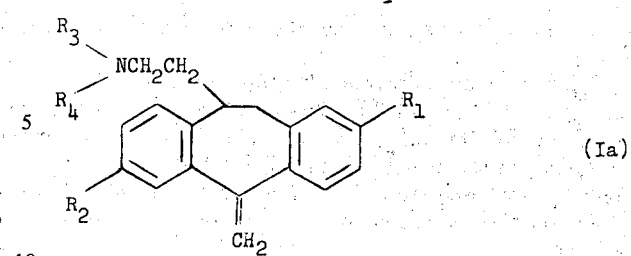

(Ia)

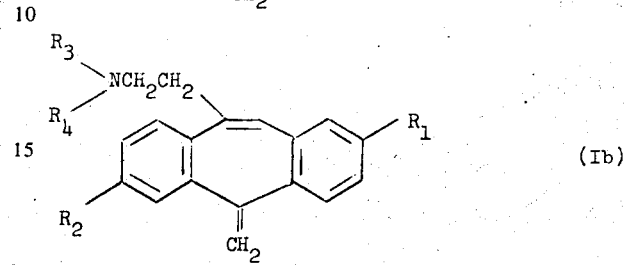

(Ib)

wherein $R_1$, $R_2$, $R_3$ and $R_4$ have the above stated significance.

The compounds of (Ia) may be prepared by the following reaction scheme A:

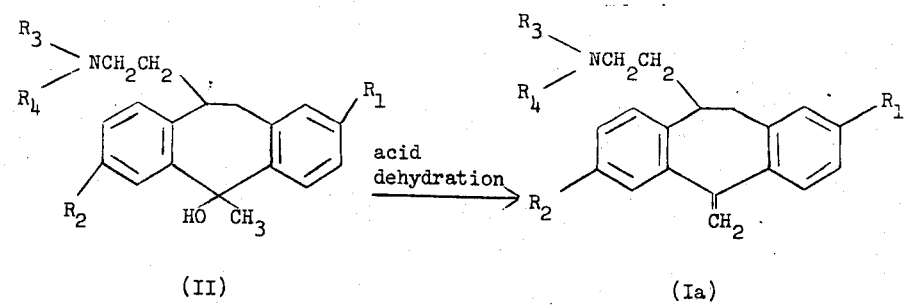

wherein $R_1$ and $R_2$ are independently hydrogen, lower alkyl having 1 to 3 carbon atoms, e.g. methyl, ethyl, propyl, or isopropyl, lower alkoxy having 1 to 3 carbon atoms, e.g. methoxy, ethoxy, propoxy, or isopropoxy, halo having an atomic weight of 19 to 36 or trifluoromethyl, $R_3$ and $R_4$ are independently lower alkyl having 1 to 3 carbon atoms, and A and B are both hydrogen, or A and B together form a carbon to carbon bond.

The compounds of formula (I) may also be represented by the following structural formulas:

wherein $R_1$, $R_2$, $R_3$ and $R_4$ have the above stated significance.

The compounds of formula (Ia) may be prepared by treating a compound of formula (II) in an acid dehydration medium such as dilute or concentrated mineral acids such as sulfuric acid, hydrochloric acid and the like, in inert hydrocarbons such as benzene, toluene and the like, at a temperature from about 50°C to the reflux temperature of the reaction medium, preferably the reflux temperature, for about 1 to 24 hours, preferably 1 to 4 hours. The preferred acid dehydration medium is 1M to 5M sulfuric acid. Neither the solvents nor the temperatures used are critical.

The compounds of formula (Ib) may be prepared by the following reaction scheme B:

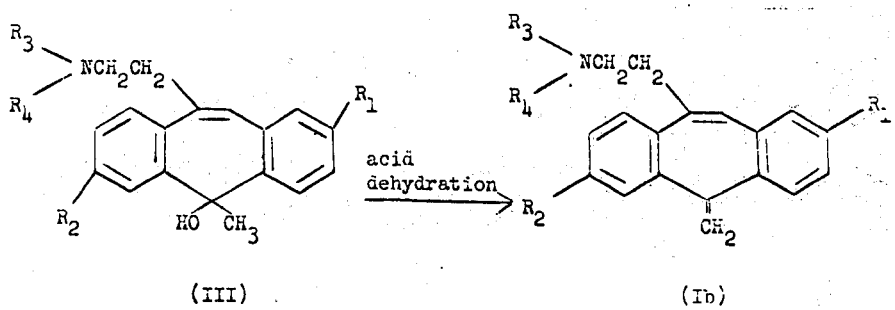

wherein $R_1$, $R_2$, $R_3$ and $R_4$ have the above stated significance.

The compounds of formula (Ib) may be prepared by the acid dehydration of a compound of formula (III), using the solvents and under the reaction conditions described in scheme A. Neither the solvents nor the temperatures used are critical. The compounds of formula (II) may be prepared by the following reaction scheme C:

wherein $R_1$, $R_2$, $R_3$, and $R_4$ and M have the above stated significance.

The compounds of formula (III) may be prepared by treating a compound of formula (VI) with an organometallic reagent of formula (V) using the solvents and under the reaction conditions described in scheme A. Neither the solvents nor the temperatures used are critical.

The compounds of formula (IV) may be prepared by

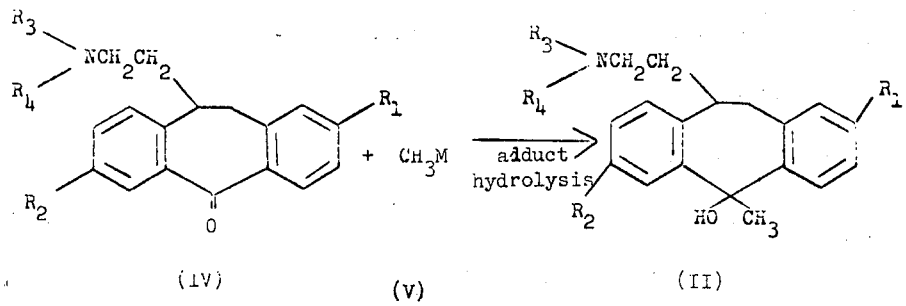

wherein $R_1$, $R_2$, $R_3$, $R_4$ have the above stated significance, and M is Li or Mg.

The compounds of formula (II) may be prepared by treating a compound of formula (IV) with an organometallic reagent of formula (V) e.g. methyllithium, and the like in the presence of an inert atmosphere e.g. nitrogen gas, in an inert solvent, such as diethyl ether, benzene, toluene and the like, at a temperature of from −20° to 10°C preferably −5° to 5°C, for about 5 to 45 minutes, preferably 10 to 20 minutes, followed by standard hydrolysis of the resulting adduct e.g. water or aqueous ammonium chloride solution. Neither the solvents nor the temperatures used are critical.

The compounds of formula (III) may be prepared by the following reaction scheme D:

the following reaction scheme E:

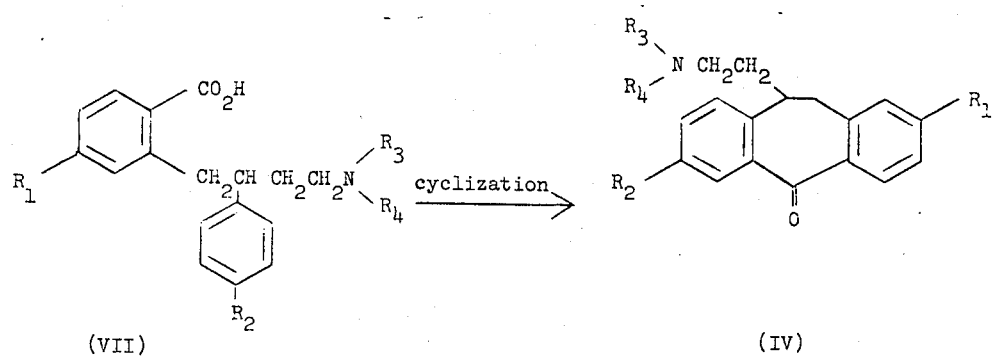

wherein $R_1$, $R_2$, $R_3$ and $R_4$ have the above stated significance.

The compounds of formula (IV) may be prepared by cyclization of a compound of formula (VII) in a strong acid medium such as sulfuric acid phosphoric acid, polyphosphoric acid and the like at a temperature of from 70° to 150°C preferably 100° to 120°C for about 3 to 24 hours, preferably about 4 to 8 hours. Neither the solvents nor the temperatures used are critical.

The compounds of formula (VI) may be prepared by the following reaction scheme F:

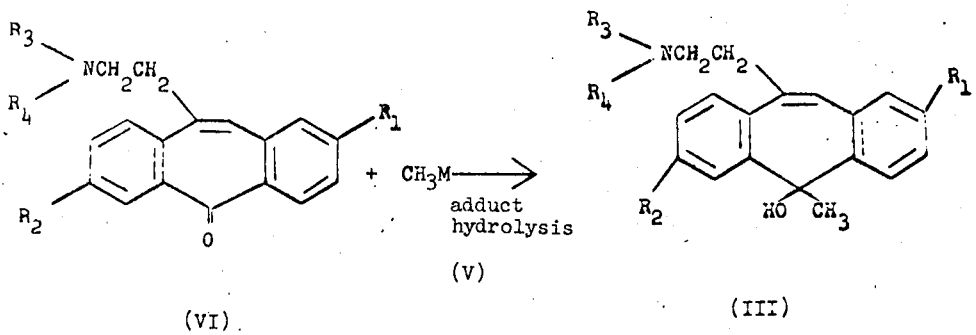

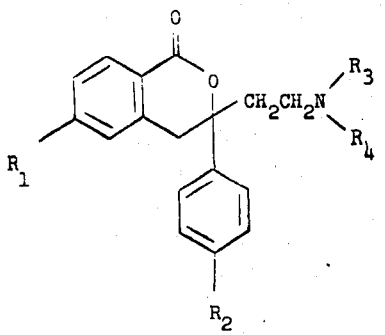

(VIII)

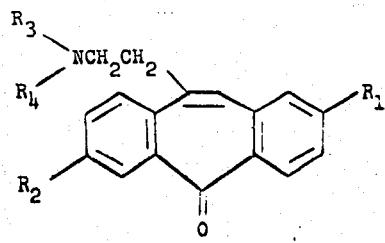

Ring Enlargement →

(VI)

wherein $R_1$, $R_2$, $R_3$ and $R_4$ have the above stated significance.

The compounds of formula (VI) may be prepared by ring enlargement of a compound of formula (VIII) under the reaction condition as described in scheme E. Neither the solvents nor the temperatures used are critical.

The compounds of formula (VII) may be prepared by the following reaction scheme G:

wherein
$R_1$, $R_2$, $R_3$ and $R_4$ are as indicated above, and
$R_5$ represents lower alkyl, as previously defined.

The compounds of formula (VIII) are prepared by heating a compound of formula (IX) optionally in inert solvent such as tetrahydrofuran, hydrocarbons or halogenated hydrocarbons such as hexane, heptane, benzene, toluene, o-dichlorobenzene and the like, at about

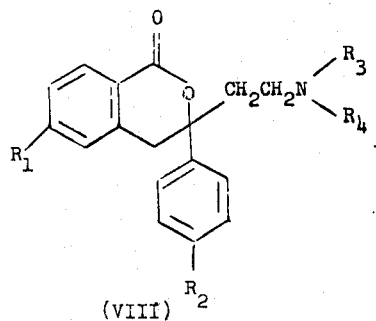

(VIII)

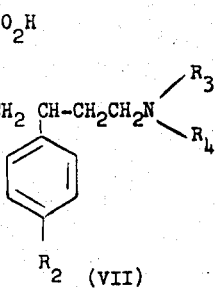

(VII)

The compounds of formula (VII) may be prepared by hydrogenating a compound of formula (VIII) in the presence of palladium on charcoal at an atmosphere of from 35 to 100 psi preferably 50 to 55 psi, in an inert lower alkanol having 1 to 4 carbon atoms, such as methanol, ethanol, propanol, isopropanol, butanol, or isobutanol, at a temperature of from 20° to 80°C. preferably 25° to 35°C, until one equivalent amount of hydrogen is absorbed. To enhance the reaction, aqueous mineral acid such as hydrochloric acid, sulfuric acid, or perchloric acid may be added to the reaction medium. Neither the solvents, temperatures or pressures used are critical.

The compounds of formula (VIII) may be prepared by the following reaction scheme H:

60°–220°C. preferably about 140°–160°C. for about 15 to 48 hours, preferably about 20 to 28 hours. The temperatures and times used are not critical. To improve yields and obtain a better quality product, the reaction may be performed under inert atmopshere, e.g. nitrogen gas.

The compounds of formulas (Ia), (Ib), (II), (III), (IV), (VI), and (VII) may exist in the form of their acid addition salts. Said salts and their respective free bases may be converted from one to the other by conventional techniques and are chemically interchangeable for purposes of the above described processes.

The compounds of formula (IX) may be prepared as indicated by the following reaction scheme I:

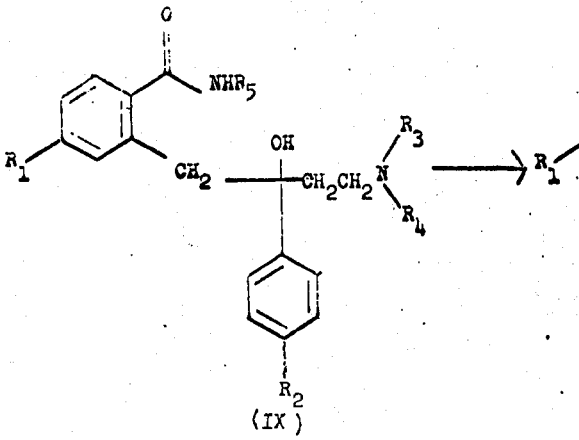

(IX)

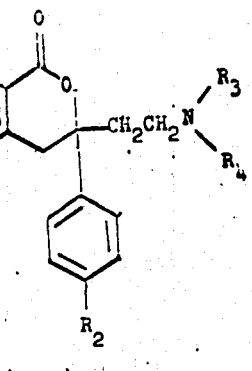

(VIII)

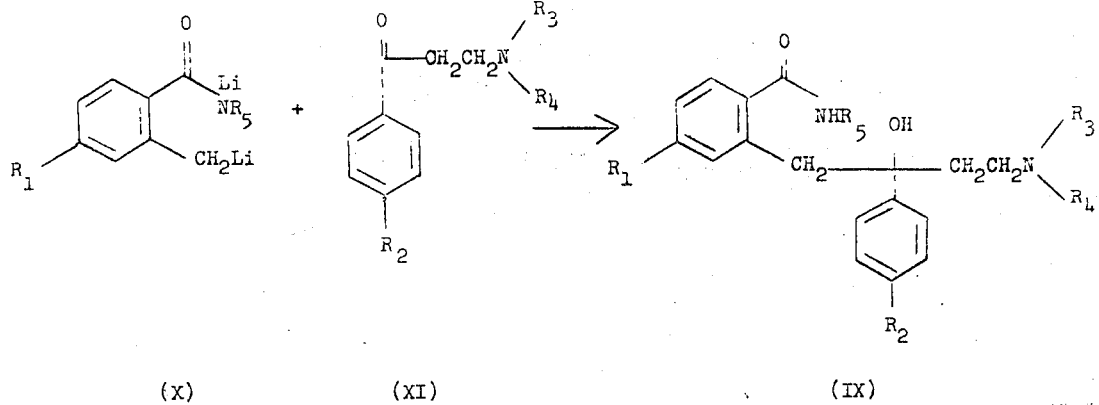

(X)  (XI)  (IX)

wherein $R_1$, $R_2$, $R_3$, $R_4$, and $R_5$ are as indicated above.

The compounds of formula (IX) are prepared by condensing a compound of formula (X) with a compound of formula (XI) in the presence of inert atmosphere, e.g. nitrogen gas, in an inert solvent such as diethyl ether, tetrahydrofuran, hexane, heptane, benzene and the like or mixtures thereof, and subjecting the reaction mixture of hydrolysis, preferably with aqueous ammonium chloride. The condensation may be carried out at a temperature of from about −80° to −20°C., preferably −60° to −40°C: for about 1 to 3 hours. The hydrolysis is performed in conventional manner at a temperature of about −20° to 0°C. Neither temperatures, solvents nor hydrolyzing agent used are critical. Compound (XI) is preferably added in inert solvent to a cold (−60° to −40°C.) inert solvent solution of compound (X).

The compounds of formula I$a$, I$b$, II, III, IV, VI, VII, VIII and IX, may be recovered using conventional recovery techniques such as crystallization.

Certain of the compounds of formula (X) and (XI) are known and may be prepared by methods disclosed in the literature. Those compounds (X) and (XI) not specifically disclosed may be prepared by analogous methods from known materials.

It will be understood that certain of the compounds of formula (VIII) exist in racemic form or in the form of optically active isomers. The separation and recovery of the respective isomers may be accomplished employing conventional techniques and such isomers are included within the scope of this invention.

The compounds of formulas (I$a$) and (I$b$) are useful because they possess pharmacological activity in animals. More particularly, the compounds of formulas (I$a$) and (I$b$) are useful as anti-depressant agents as indicated by their activity in mice given intraperitoneally 0.1 to 25 mg/kg of body weight of active material, and tested by the method basically as described by Spencer, P.S.J., Antagonism of Hypothermia in the Mouse by Anti-depressant Drugs, pp. 194–204, Ed. S. Garattini and M. N. G. Dukes, Excerpta Medica Foundation, 1967, and by their activity in the cat given typically 0.25–2.0 mg/kg of body weight of active material and tested for their effect on 5-hydroxytryptophan and 1-tryptophan induced spinal monosynaptic reflex transmission, basically as described by Anderson E. G. and Shibuya T., the Effects of 5-Hydroxytryptophan and 1-tryptophan on Spinal Synaptic Activity, pp. 352 to 360, J. of Pharm. and Exp. Therapeutics, Vol. 153, No. 2, 1966.

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I$a$) and (I$b$) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as succinate, benzoate, acetate, p-toluenesulfonate, benzenesulfonate, maleate and the like.

In general, satisfactory results are obtained when the compounds are administered as anti-depressants at a daily dosage of from about 0.2 to 100 milligrams per kilogram of animal body weight. This daily dosage is preferably given in divided doses, e.g., 2 to 4 times a day, or in sustained release form. For most large animals, the total daily dosage is from about 15 to 600 milligrams and dosage forms suitable for internal administration comprise from about 3.75 to 300 milligrams of the compound in admixture with a solid or liquid pharmaceutical carrier or diluent.

EXAMPLE 1

2-($\beta$-[2-dimethylaminoethyl]-$\beta$-hydroxyphenethyl)-N-methylbenzamide

To a flask equipped with a stirrer, dropping funnel, condenser and gas inlet tube maintained under a nitrogen atmosphere there is added at room temperature 40.0 g (0.28 mole) of o-methyl-N-methyl benzamide and 250 ml of anhydrous tetrahydrofuran. The reaction flask is immersed in an ice bath and cooled to an internal temperature of 5°C. Stirring is added dropwise in ca. 1 hour maintaining the temperature below 8°C. The resulting red dilithio salt (compound X) is stirred at 5°C. for 1 additional hour and the reaction flask is then immersed in a dry-ice acetone bath and cooled to an internal temperature of −60°C. To the cold reaction mixture a solution of 49.7 g. (0.28 mole) 3-dimethylaminopropiophenone in 140 ml. anhydrous tetrahydrofuran is added dropwise in ca. 45 min. maintaining the temperature between −60°C and −50°C. The resulting reaction mixture is stirred at −60°C. for 1 hour, allowed to warm to 0°C. in ca. 1 hour, and then treated with 200 ml. of saturated aqueous ammonium chloride while maintaining the temperature below 10°C. The resulting solid is filtered, washed thoroughly with water and recrystallized from methylene chloride-ether (1:1) to give 2-(β-[2-dimethylaminoethyl]-β-hydroxyphenethyl)-N-methylbenzamide; m.p. 139.5°–140.5°C.

When the above detailed process is carried out and in place of o-methyl-N-methyl benzamide there is used
  a. N,2, 4-trimethylbenzamide,
  b. 4-methoxy-N,2-dimethylbenzamide,
  c. 4-chloro-N,2-dimethylbenzamide,
  d. o-methyl-N-methyl benzamide, or
  e. 4-trifluoromethyl-N,2-dimethylbenzamide,
and in place of 3-dimethylaminopropiophenone there is used,
  a. 3-dimethylamino-4'-methylpropiophenone,
  b. 3-dimethylamino-4'-methoxypropiophenone,
  c. 4'-chloro-3-dimethylaminopropiophenone,
  d. 3-diisopropylaminopropiophenone, or
  e. 3-dimethylamino-4'-trifluromethylpropiophenone,
and combining the correspondingly lettered benzamides and propriophenone, there is obtained.
  a. 2-(4-dimethylamino-2-hydroxy-2-p-methylphenyl) butyl-N, 4-dimethylbenzamide,
  b. 2-(β-[2-dimethylaminoethyl]-β-hydroxy-4-methoxyphenethyl)-4-methoxy-N-methylbenzamide.
  c. 4-chloro-2-(4-chloro-β-[2-dimethylaminoethyl]-β-hydroxyphenethyl)-N-methylbenzamide,
  d. 2-(β-hydroxy-β-[2-diisopropylaminoethyl]phenethyl)-N-methylbenzamide, or
  e. 2-(β-[2-dimethylaminoethyl]-β-hydroxy-4-trifluoromethylphenethyl)-4-trifluoromethyl-N-methylbenzamide, respectively.

EXAMPLE 2

3-[2-dimethylaminoethyl]-3,4-dihydro-3-phenylisocoumarin

To a flask equipped with a stirrer, condenser and gas inlet tube maintained under a nitrogen atmosphere there is added at room temperature 16.3 g (0.05mole) of 2-(β-[2-dimethylaminoethyl]-β-hydroxyphenethyl)-N-methylbenzamide and 170 ml of o-dichloro benzene. Stirring is initiated and the mixture is heated at reflux for 18 hours. The excess o-dichlorobenzene is then removed by distillation in vacuo and the resulting oil is crystallized from ether to give 3-[2-dimethylaminoethyl]-3,4-dihydro-3-phenylisocoumarin; m.p. 95.0°–95.5°C.

When the above process is carried out and in place of 2-(β-[2-dimethylaminoethyl]-β-hydroxyphenethyl)-N-methylbenzamide, there is used
  a. 2-(4-dimethylamino-2-hydroxy-2-p-methylphenyl) butyl-N, 4-dimethylbenzamide,
  b. 2-(β-[2-dimethylaminoethyl]-β-hydroxy-4-methoxyphenethyl)-4-methoxy-N-methylbenzamide,
  c. 4-chloro-2-(4-chloro-β-[2-dimethylaminoethyl]-β-hydroxyphenethyl)-N-methylbenzamide,
  d. 2-(β-hydroxy-β-[2-diisopropylaminoethyl]phenethyl)-N-methylbenzamide, or
  e. 2-(β-[2-dimethylaminoethyl]-β-hydroxy-4-trifluoromethylphenethyl)-4-trifluoromethyl-N-methylbenzamide,
there is obtained
  a) 3-(2-dimethylaminoethyl)-3,4-dihydro-3-(4-methylphenyl)-6-methylisocoumarin,
  b) 3-(2-dimethylaminoethyl)-3,4-dihydro-3-(4-methoxyphenyl)-6-methoxy isocoumarin,
  c) 6-chloro-3-(4-chlorophenyl)-3-(2-dimethylaminoethyl)-3,4-dihydroisocoumarin
  d) 3-(2-diisopropylaminoethyl)-3,4-dihydro-3-phenylisocoumarin, or
  e) 3-(2-dimethylaminoethyl)-3,4-dihydro-3-(4-trifluoromethylphenyl)-6-trifluoromethylisocoumarin, respectively.

EXAMPLE 3

10-(2-dimethylaminoethyl)-10,11-dihydro-5-methylene,5H-dibenzo [a,d] cycloheptane maleate Step A 2-(β-[2-dimethylaminoethyl]phenethyl)benzoic acid hydrochloride A solution of 14.75 g (0.05 mole) of 3-(2-dimethylaminoethyl)- 3,4-dihydro-3-phenylisocoumarin in 150 ml ethanol containing 5 ml conc. hydrochloric acid and 1g 10% palladium on charcoal is hydrogenated at 50 psi and room temperature till one equivalent of hydrogen is absorbed. The mixture is filtered and evaporated to give the intermediate 2-(β-[2-dimethylaminoethyl]phenethyl)benzoic acid hydrochloride, m.p. 153°–6°C.

Step B 10-(2-dimethylaminoethyl)-10,11-dihydro-5H-dibenzo[a,d] cyclohepten-5-one hydrochloride A mixture of 14.75 g (0.05 mole) of 2-(β-[2-dimethylaminoethyl]phenethyl) benzoic acid hydrochloride and 150 g polyphosphoric acid is heated at 110°C for 6 hrs. allowed to cool and poured onto crushed ice with stirring. The resulting solution is cooled on ice and made basic by the addition of solid potassium hydroxide, and extracted with methylene chloride. The methylene chloride is washed with water, dried over anhydride magnesium sulfate and evaporated in vacuo. The residue is dissolved in isopropanol, and treated with gaseous hydrogen chloride. The resulting precipitate is filtered and recrystallized from isopropanol to give the intermediate 10-(2-dimethylaminoethyl)-10,11-dihydro-5H-dibenzo [a,d] cyclohepten -5-one hydrochloride, m.p. 188°–190°C.

Step C 10-(2-dimethylaminoethyl)-10,11-dihydro-5-methyl-5H-dibenzo[a,d] cyclohepten-5-ol To a solution of 19.4 g (0.07 mole) of 10-(2-dimethylaminoethyl) -10,11-dihydro-5H-dibenzo[a,d] -cyclohepten-5-one in 200 ml diethylether, under nitrogen, cooled to −5° 70 ml 1.5N methyllithium (0.105 mole) in diethylether is added dropwise with stirring, maintaining temperature below 0°, 15 minutes after the addition is complete the reaction is quenched by the addition of 50 ml saturated ammonium chloride solution. The organic layer is separated, extracted with saturated sodium chloride solution, dried over anhydrous, magnesium sulfate and evaporated. The crystalline residue is recrystallized from methylenechloride-methanol 1:1 to give the intermediate 10-(2-dimethylaminoethyl)-10,11,-dihydro-5-methyl-5H-dibenzo[a,d]cyclohepten-5-ol, m.p. 161.5°–162°C.

Step D 10-(2-dimethylaminoethyl)-10,11-dihydro-5-methylene-5H-dibenzo[a,d]cycloheptene maleate A mixture of 8g (0.027 mole) of 10-(2-dimethylaminoethyl)-10,11-dihydro-5-methyl-5H-dibenzo[a,d]-cyclohepten-5-ol and 250 ml 2M-sulfuric acid is refluxed for 2 hrs. The mixture is cooled in ice and made basic by the addition of solid potassium hydroxide. The mixture is extracted with methylene chloride. The methylene chloride is washed with water, dried over anhyd. magnesium sulfate and evaporated in vacuo. The oily residue is distilled at 140°C/0.5mm and the distillate is dissolved in ethanol and treated with maleic acid. The precipitate is filtered and recrystallized from diethylether-ethanol 1:1 to give the product 10-(2-dimethylaminoethyl)-10,11-dihydro-5-methylene-5H-dibenzo[a,d]cycloheptene maleate, m.p. 171°–172°C.

EXAMPLE 4

Step A

Following the procedure of Example 3, step A and in place of 3-(2-dimethylaminoethyl)-3,4-dihydro-3-phenylisocoumarin, and starting with;
- a. 3-(2-dimethylaminoethyl)-3,4-dihydro-3-(4-methylphenyl)-6-methylisocoumarin
- b. 3-(2-dimethylaminoethyl)-3,4-dihydro-3-(4-methoxyphenyl)-6-methoxy isocoumarin,
- c. 3-(4-chlorophenyl)-3-(2-dimethylaminoethyl)-3,4-dihydro-6-chloro isocoumarin,
- d. -3-(2-diisopropylaminoethyl)-3,4-dihydro-3-phenylisoumarin,
- e. 3-(2-dimethylaminoethyl)-3,4-dihydro-6-trifluoromethyl-3-(4-trifluoromethylphenyl)isocoumarin, the following intermediates are obtained,
- a. 2-(β-[2-dimethylaminoethyl]-p-methylphenethyl)-4-methylbenzoic acid hydrochloride,
- b. 2-(β-[2-dimethylamininoethyl]-p-methoxyphenethyl)-4-methoxybenzoic acid hydrochloride,
- c. 4-chloro-2-(β-[2-dimethylaminoethyl]-p-chlorophenethyl)benzoic acid hydrochloride,
- d. 2-(β-[2-diisopropylaminoethyl]phenethylbenzoic acid hydrochloride, or
- e. 2-(β-[2-dimethylaminoethyl]-p-trifluoromethylphenethyl)-4-trifluoromethylbenzoic acid hydrochloride, respectively.

Step B

Following the procedure of Example 3, step B and in place of 2-(β-[2-dimethylaminoethyl]phenethyl)benzoic acid hydrochloride, and starting with the correspondingly lettered intermediate of step A of this example, the following intermediates are obtained,
- a. 10-(2-dimethylaminoethyl)-10,11-dihydro-2,7-dimethyl-5H-dibenzo[a,d]cyclohepten-5-one hydrochloride,
- b. 10-(2-dimethylaminoethyl)-10,11-dihydro-2,7-dimethoxy-5H-dibenzo[a,d]cyclohepten-5-one hydrochloride,
- c. 10-(2-dimethylaminoethyl)-10,11-dihydro-2,7-dichloro-5H-dibenzo[a,d] cyclohepten-5-one hydrochloride,
- d. 10-(2-diisopropylaminoethyl)-10,11-dihydro-5H-dibenzo[a,d]cyclohepten- 5-one hydrochloride, or
- e. 10-(2-dimethylaminoethyl)-10,11-dihydro-2,7-bis(trifluoromethyl)-5H-dibenzo[a,d]cyclohepten-5-one hydrochloride, respectively.

Step C

Following the procedure of Example 3, step C and in the place of 10-(2-dimethylaminoethyl)-10,11-dihydro-5H-dibenzo[a,d]-cyclohepten-5-one hydrochloride, and starting with the correspondingly lettered intermediate of step B of this Example, the following intermediates are obtained,
- a. 10-(2-dimethylaminoethyl)-10,11-dihydro-2,5,7-trimethyl-5H-dibenzo[a,d] cyclohepten-5-ol,
- b. 10-(2-dimethylaminoethyl)-10,11-dihydro-2,7-dimethoxy-5-methyl-5H-dibenzo[a,d] cyclohepten-5-ol,
- c. 10-(2-dimethylaminoethyl)-10,11-dihydro-2,7-dichloro-5-methyl-5H-dibenzo[a,d]cyclohepten-5-ol,
- d. 10-(2-diisopropylaminoethyl)-10,11-dihydro-5-methyl-5H-dibenzo[a,d]cyclohepten-5-ol, or
- e. 10-(2-dimethylaminoethyl)-10,11-dihydro-5-methyl-2,7-bis (trifluoromethyl)-5H-dibenzo[a,d]cyclohepten-5-ol, respectively.

Step D

Following the procedure of Example 3, step D and in place of 10-(2-dimethylaminoethyl)-10,11-dihydro-5methyl-5H-dibenzo[a,d]-cyclohepten-5-ol, and starting with the correspondingly lettered intermediate of step C of this Example, the following products are obtained,
- a. 10-(2-dimethylaminoethyl)-10,11-dihydro-2,7-dimethyl-5-methylene-5H-dibenzo[a,d]cycloheptene maleate,
- b. 10-(2-dimethylaminoethyl)-10,11-dihydro-2,7-dimethoxy-5-methylene-5H-dibenzo[a,d]cycloheptene maleate.
- c. 10-(2-dimethylaminoethyl)-10,11-dihydro-2,7-dichloro-5-methylene-5H-dibenzo[a,d]cycloheptene maleate,
- d. 10-(2-diisopropylaminoethyl)-10,11-dihydro-5-methylene-5H-dibenzo[a,d]cycloheptene maleate, or
- e. 10-(2-dimethylaminoethyl)-10-11-dihydro-2,7-bis(trifluoromethyl)-5-methylene- 5H-dibenzo[a,d]cycloheptene maleate, respectively.

EXAMPLE 5

10-(2-dimethylaminoethyl)-5-methylene-5H-dibenzo[a,d]cycloheptene hydrochloride

Step A 10-(2-dimethylaminoethyl)-5H-dibenzo[a,d]cyclohepten-5-one hydrochloride

A mixture of 14.75 g (0105 mole) of 3-(2-dimethylaminoethyl)-3,4-dihydro-3-phenylisocoumarin and 150 g polyphosphoric acid is heated at 110° for 6 hrs., allowed to cool and poured onto crushed ice with stirring. The resulting solution is cooleld in ice and made basic by the addition of solid potassium hydroxide and extracted with methylene chloride. The methylenechloride is washed with water, dried over anhyd. magnesium sulphate and evaporated in vacuo. The residue is dissolved in isopropanol, treated with gaseous hydrogen chloride. The resulting precipitate is filtered and recrystallized from isopropanol to give the intermediate 10-(2-dimethylaminoethyl) -5H-dibenzo[a,d]cyclohepten-5-one hydrochloride, m.p. 204°–206°°C.

Step B 10-(2-dimethylaminoethyl)-5-methyl-5H-dibenzo[a,d]cycloheptene-5-ol

To a solution of 19.4 g (0.070 mole) of 10-(2-dimethylaminoethyl)-5H-dibenzo[a,d]-cycloheptene-5-one in 200 ml diethylether under nitrogen cooled to −5°C, 70 ml of 1.5M methyllithium (0.105 mole) in diethylether is added dropwise with stirring, maintaining temperature below 0°, 15 minutes after the addition is complete the reaction is quenched by the addition of 80 ml saturated ammonium chloride solution. The organic layer is separated, extracted with saturated sodium chloride solution, dried over anhyd. magnesium sulfate and evaporated. The crystalline residue is recrystallized from methylenechloride-diethylether to give the intermediate 10-(2-dimethylaminoethyl)-5-methyl-5H-dibenzo[a,d cyclohepten-5-ol, m.p. 135°–136.5°C.

Step C 10-(2-dimethylaminoethyl)-5-methylene-5H-dibenzo[a,d]cycloheptene hydrochloride A mixture of 8g (0.027 mole) of 10-(2-dimethylaminoethyl)-5-methyl-5H-dibenzo[a,d]-cycloheptene-5-ol and 250 ml 2M sulfuric acid is refluxed for 2 hrs. The mixture is cooled in ice and made basic by the addition of solid potassium hydroxide. The mixture is extracted with methylene-chloride, the methylenechloride is washed with water, dried over anhydrous meagnesium sulfate and evaporated in vacuo. The oily residue is distilled at 140°C/0.5mm and the distillate is dissolved in diethylether and treated with gaseous hydrogen chloride. The precipitate is filtered and recrystallized from diethylether-ethanol 1:1 to give the product 10-(2-dimethylaminoethyl)5-methylene-5H-dibenzo[a,d]cycloheptene hydrochloride, m.p. 162.5°–163°C.

EXAMPLE 6

Step A

Following the procedure of Example 5, step A and in place of 3-(2-dimethylaminoethyl)-3,4-dihydro-3-phenyl isocoumarin, and starting with;

a. 3-(2-dimethylaminoethyl)-3,4-dihydro-3-(4-methylphenyl)-4-methylisocoumarin,
b. 3-(2-dimethylaminoethyl)-3,4-dihydro-3-(4-methoxyphenyl)-6-methoxyisocoumarin,
c. 3-(4-chlorophenyl)-3-(2-dimethylaminoethyl)-3,4-dihydro-6chloroisocoumarin,
d. 3,4-dihydro-3-phenyl-3(2-diisopropylaminoethyl)isocoumarin, or
e. 3-(2-dimethylaminoethyl)-3,4-dihydro- 6-trifluoromethyl-3-(4-trifluoromethylphenyl) isocoumarin, the following intermediates are obtained, a. 10-(2-dimethylaminoethyl)-2,7-dimethyl-5H-dibenzo[a,d]cyclohepten-5-one hydrochloride,
b. 10-(2-dimethylaminoethyl)-2,7-dimethoxy-5H-dibenzo[a,d]cyclohepten- 5-one hydrochloride,
c. 10-(2-dimethylaminoethyl)-2,7-dichloro-5H-dibenzo[a,d]cyclohepten -5-one hydrochloride,
d. 10-(2-diisopropylaminoethyl)-5H-dibenzo[a,d]cyclohepten -5-one hydrochloride, or
e. 10-(2-dimethylaminoethyl)-2,7-bis (trifluoromethyl)-5H-dibenzo[a,d]cyclohepten -5-one hydrochloride, respectively.

Step B

Following the procedure of Example 6, step B and in the place of 10-(2-dimethylaminoethyl)-5H-dibenzo[a,d]-cyclohepten -5-one hydrochloride, and starting with the correspondingly lettered intermediate of step A of this Example, the following intermediates are obtained, a. 10-(2-dimethylaminoethyl)-2,5,7-trimethyl-5H-dibenzo[a,d]cyclohepten-5-ol,
b. 10-(2-dimethylaminoethyl)-2,7-dimethoxy-5-methyl-5H-dibenzo [a,d] cyclohepten 5-ol,
c. 10-(2-dimethylaminoethyl)-2,7-dichloro-5-methyl-5H-dibenzo[a,d]cyclohepten -5-ol,
d. 10-(2-diisopropylaminoethyl)-5-methyl-5H-dibenzo[a,d]cyclohepten-5-ol, or
e. 10-(2-dimethylaminoethyl)-5-methyl-2,7-bis(trifluoromethyl)-5H-dibenzo [a,d] cyclohepten-5-ol, respectively.

Step C

Following the procedure of Example 6, step C and in place of 10-(2-dimethylaminoethyl)-5-methyl-5H-dibenzo [a,d]-cyclohepten-5-ol, and starting with the correspondingly lettered intermediate of step B of this Example, the following products are obtained, a. 10-(2-dimethylaminoethyl)-2,7-dimethyl-5-methylene-5H-dibenzo[a,d]cycloheptene hydrochloride,
b. 10-(2-dimethylaminoethyl)-2-7-dimethoxy-5-methylene-5H-dibenzo[a,d]cycloheptene hydrochloride,
c. 10-(2-dimethylaminoethyl)-2,7-dichloro-5-methylene-5H-dibenzo[a,d]cycloheptene hydrochloride,
d. 10-(2-diisopropylaminoethyl)-5-methylene-5H-dibenzo[a,d]cycloheptene hydrochloride, or
e. 10-(2-dimethylaminoethyl)-2,7-bis(trifluoromethyl)-5-methylene-5H-dibenzo[a,d]cycloheptene hydrochloride, respectively.

EXAMPLES 7 and 8

Tablets and Capsules Suitable for Oral Administration

Tablets and capsules containing the ingredients indicated below may be prepared by conventional techniques and are useful as anti-depressants at a dose of one tablet or capsule 2 to 4 times a day.

| Ingredients | Weight (mg) | |
|---|---|---|
| | tablet | capsule |
| 10-(2-dimethylaminoethyl)-10,11-dihydro-5-methylene-5H-dibenzo[a,d]cycloheptene | 25 | 25 |
| tragacanth | 10 | — |
| lactose | 222.5 | 275 |
| corn starch | 25 | |
| talcum | 15 | |
| magnesium stearate | 2.5 | |

EXAMPLES 9 and 10

Sterile Suspension for Injecton and Oral Liquid Suspension

The following pharmaceutical compositions are formulated with the indicated amount of active agent using conventional techniques. The injectable suspension and the oral liquid suspension represent formulations useful as unit doses and may be administered as anti-depressants. The injectable suspension is suitable for administration once a day where as the oral liquid suspension is suitably administered 2 to 4 times per day for this purpose.

| Ingredients | Weight (mg) Sterile Injectable Suspension | Oral Liquid Suspension |
|---|---|---|
| 10-(2-dimethylaminoethyl)-10,11-dihydro-5-methylene-5H-dibenzo[a,d]cycloheptene | 25 | 25 |
| sodium carboxy methyl cellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g., Tween 80), U.S.P. | — | 5 |
| sorbitol solution, 70%, U.S.P. | — | 2,500 |
| buffer agent to adjust pH for desired stability | q.s. | q.s. |
| water | for injection, q.s. to 1 ml. | q.s. to 5 ml. |

EXAMPLES 11 and 12

Following the disclosure of Examples 7 and 8, and in place of 10-(2-dimethylaminoethyl)-10,11-dihydro-5-methylene-5H-dibenzo[a,d]cycloheptene starting with 10-(2-dimethylaminoethyl)-5-methylene 5H-dibenzo[a,d]cycloheptene, tablets and capsules may be prepared which are useful as anti-depressants at a dose of one tablet or capsule 2 to 4 times a day.

EXAMPLES 13 and 14

Following the disclosure of Examples 9 and 10, and in place of 10-(2-dimethylaminoethyl)-10,11-dihydro-5- methylene-5H-dibenzo[a,d]cycloheptene starting with 10-(2-dimethylaminoethyl)-5-methylene-5H-dibenzo[a,d]cycloheptene, injectable suspensions and oral liquid suspensions may be prepared. The injectable suspension is suitable for administration once a day whereas the oral liquid suspension is suitably administered 2 to 4 times per day for this purpose.

What is claimed:

1. A compound having the formula

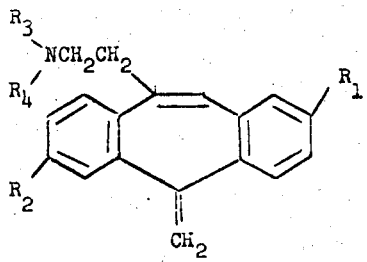

wherein
   $R_1$ and $R_2$ are independently hydrogen, lower alkyl having 1 to 3 carbon atoms, lower alkoxy having 1 to 3 carbons atoms, halo having an atomic weight of 19 to 36 or trifluoromethyl,
   $R_3$ and $R_4$ are independently lower alkyl having 1 to 3 carbon atoms.

2. A pharmaceutically acceptable acid addition salt of a compound of claim 1.

3. The compound of claim 1 which is 10-(2-dimethylaminoethyl)- 5-methylene-5H-dibenzo[a,d]cycloheptene.

* * * * *